United States Patent
Borgatti et al.

(10) Patent No.: US 8,684,724 B2
(45) Date of Patent: Apr. 1, 2014

(54) PLANT FOR BLOW-MOULDING PLASTIC CONTAINERS, PARTICULARLY BOTTLES

(75) Inventors: Maurizio Borgatti, Imola (IT); Massimo Morovingi, Imola (IT); Fiorenzo Parrinello, Medicina (IT); Emilio Re, Ancona (IT); Gabriele Stocchi, Parma (IT)

(73) Assignee: Sacmi Cooperativa Meccanici Imola Societa' Cooperativa, Imola (IT)

( * ) Notice: Subject to any disclaimer, the term of this patent is extended or adjusted under 35 U.S.C. 154(b) by 205 days.

(21) Appl. No.: 13/054,967

(22) PCT Filed: Jul. 28, 2009

(86) PCT No.: PCT/IB2009/053278
§ 371 (c)(1),
(2), (4) Date: Feb. 24, 2011

(87) PCT Pub. No.: WO2010/013200
PCT Pub. Date: Feb. 4, 2010

(65) Prior Publication Data
US 2011/0151047 A1 Jun. 23, 2011

(30) Foreign Application Priority Data
Jul. 29, 2008 (IT) .............................. BO2008A0469

(51) Int. Cl.
*B29C 49/68* (2006.01)
*B29C 31/08* (2006.01)

(52) U.S. Cl.
USPC .......................................... 425/526; 425/534

(58) Field of Classification Search
USPC .................................................. 425/526, 534
See application file for complete search history.

(56) References Cited

U.S. PATENT DOCUMENTS

| | | | | |
|---|---|---|---|---|
| 3,850,566 A | * | 11/1974 | Moore | 425/526 |
| 5,308,233 A | * | 5/1994 | Denis et al. | 425/534 |
| 5,683,729 A | * | 11/1997 | Valles | 425/526 |
| 5,783,232 A | * | 7/1998 | Roos et al. | 425/526 |
| 5,863,571 A | | 1/1999 | Santais et al. | |
| 6,770,238 B2 | * | 8/2004 | Choinski | 425/534 |
| 6,976,836 B2 | * | 12/2005 | Suzuki | 425/526 |

FOREIGN PATENT DOCUMENTS

| | | |
|---|---|---|
| DE | 26 15 007 A1 | 10/1977 |
| DE | 199 06 309 A1 | 8/2000 |
| DE | 199 06 439 A1 | 8/2000 |
| JP | H10193446 A | 7/1998 |
| WO | 01/58671 A1 | 8/2001 |
| WO | 02/49829 A1 | 6/2002 |
| WO | 02/053350 A1 | 7/2002 |

* cited by examiner

*Primary Examiner* — Robert B Davis
(74) *Attorney, Agent, or Firm* — Pearne & Gordon LLP

(57) ABSTRACT

A plant for blow-molding plastic containers (2), particularly bottles, from respective parisons (3) is equipped with a plurality of molding units (15), each having at least two respective cavities (19) for blow-molding respective containers (2), and with a transfer device (39) for transferring the parisons (3) from a flexible feed conveyor (41) to the respective molding cavities (19). The transfer device (39) is connected to the flexible feed conveyor (41) at a transfer station (40), where the spacing (P1) of the parisons (3) is equal to the distance (D2) between the longitudinal axes (19a) of the molding cavities (19) of one molding unit (15).

12 Claims, 8 Drawing Sheets

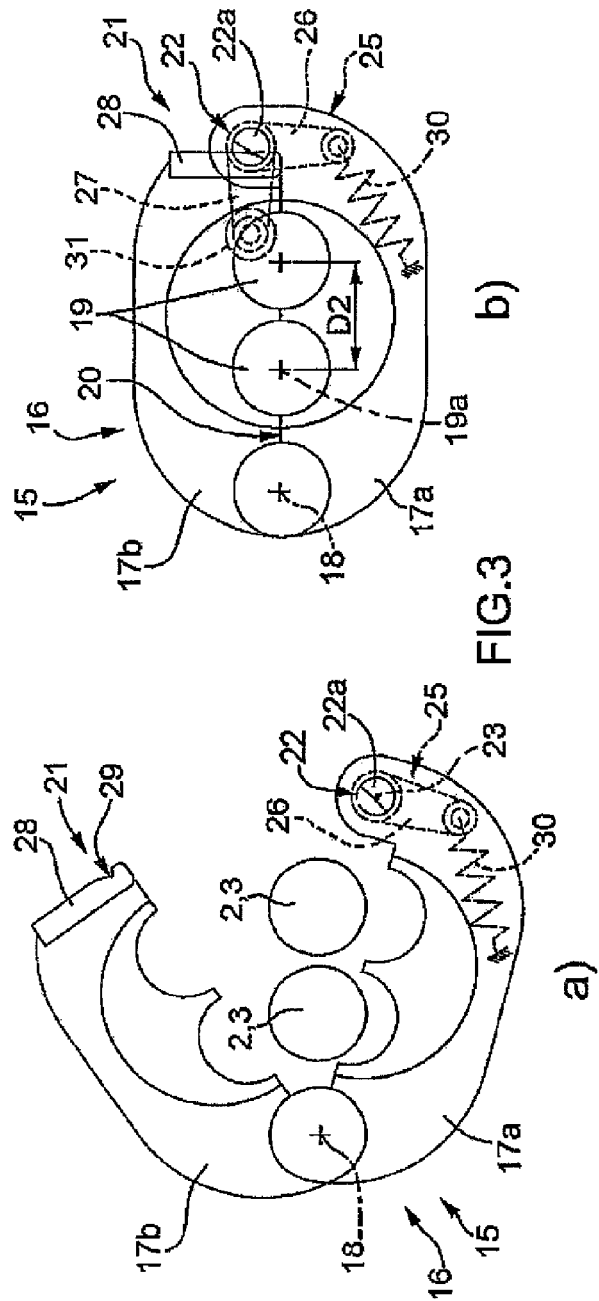
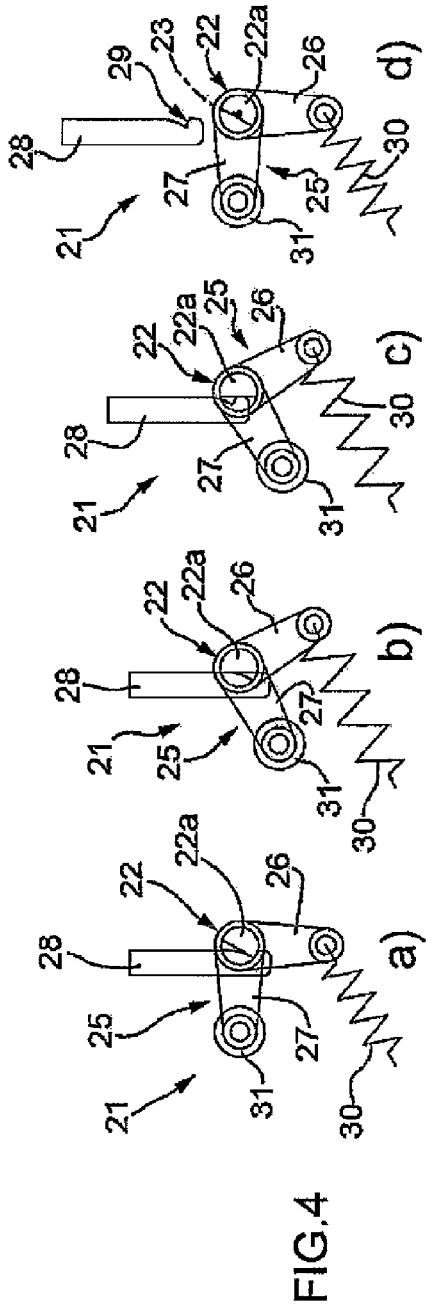
FIG.3
FIG.4

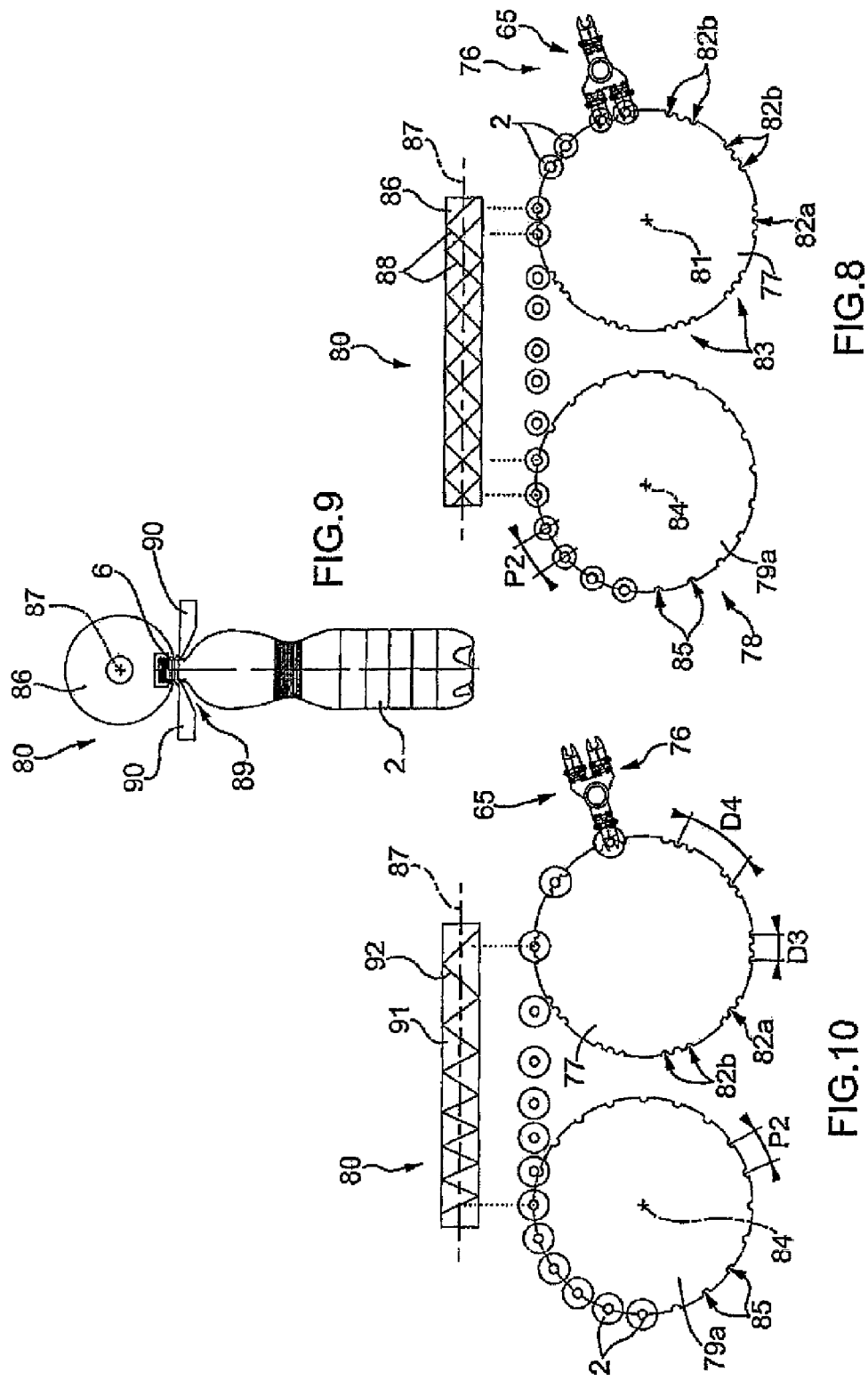

PLANT FOR BLOW-MOULDING PLASTIC CONTAINERS, PARTICULARLY BOTTLES

TECHNICAL FIELD

This invention relates to a plant for blow-moulding plastic containers, particularly bottles.

BACKGROUND ART

In the bottling industry, prior art plant for making plastic bottles comprises: a blow-moulding wheel mounted in such a way as to rotate about its longitudinal axis and equipped with a plurality of blow-moulding units, each of which is rotationally fed by the blow-moulding wheel about this axis and comprises two cavities for blow-moulding respective bottles; an oven for thermally conditioning the parisons; a feed device for advancing the parisons through the oven according to a first, predetermined spacing; and a transfer device for transferring the parisons from the feed device to the blow-moulding cavities.

Since the first predetermined spacing is normally smaller than the distance between the longitudinal axes of the moulding cavities of one blow-moulding unit, the transfer device comprises a first variable spacing transfer wheel designed to pick up each parison from the feed device and space them according to this distance, and a second transfer wheel designed to transfer pairs of parisons from the first transfer wheel to the respective moulding cavities.

Alternatively, the prior art in this industry also teaches the use of plant comprising two ovens for thermally conditioning the parisons; two feed devices for advancing the parisons through the ovens; and one transfer wheel equipped with a plurality of pick-up and transporting units each comprising two pick-up and transporting members whose respective longitudinal axes are spaced at a distance from each other that is equal to the distance between the longitudinal axes of the moulding cavities of one moulding unit, which are designed to pick up one parison each from a respective feed device and to transfer a pair of parisons to the respective moulding cavities.

Plants of the type described above have several disadvantages, due mainly to the fact that the presence of two transfer wheels or, alternatively, two ovens and two feed devices, makes these plants relatively complex and expensive.

Also known in the prior art, from patent document DE19906309, is a system of transferring parisons from the oven to the blow-moulding machine. The system comprises associating the parisons in pairs to gripping elements which are in turn removably associated with both the conveyor of the oven and with the transfer star wheel interposed between the oven and the blow-moulding machine. Thus, the parisons are always associated with the gripping elements which move from the oven to the transfer star wheel carrying the parisons along with them. This enables pairs of parisons to be kept at a desired constant distance from each other (set by the geometry of the gripping element) during transfer.

This solution, too, however, is not free of disadvantages.

That is because the presence of gripping elements that move along the plant involves a complication in the plant itself and increases the risk of faults and malfunctioning. Moreover, the presence of gripping elements interposed between the parisons and the conveyor of the oven makes it difficult to optimize parison spacing inside the oven.

AIM OF THE INVENTION

This invention has for an aim to provide a blow-moulding plant for making plastic containers, particularly bottles, that is free of the above mentioned disadvantages and that is simple and inexpensive to implement.

Accordingly, this invention provides a plant for blow-moulding plastic containers, particularly bottles, as described in the appended claims.

More specifically, this invention provides a blow-moulding plant for making plastic containers, in particular bottles, from respective parisons and comprising:

a blow-moulding line equipped with a plurality of moulding units, each comprising at least two cavities for blow-moulding respective containers, the moulding cavities of each moulding unit having respective first longitudinal axes positioned at a first predetermined distance D2 from each other;

a flexible feed conveyor which is equipped with a plurality of members for picking up and transporting respective parisons and which extends through a thermal conditioning device;

a parison transfer device coupled to the blow-moulding line at a first transfer station for transferring the parisons to the moulding units and coupled to the flexible feed conveyor at a second transfer station for receiving the parisons.

The plant also comprises a plurality of pick-up and transfer members associated with the flexible feed conveyor for moving the parisons individually along a predetermined path.

Further, the flexible feed conveyor, at the second transfer station, is shaped in such a way that the parisons engaged with the respective pick-up and transfer members are spaced on the flexible feed conveyor according to a spacing P1 that is equal to the first distance D2 so that they can be picked up directly from the transfer device.

The fact that the parisons are picked up directly from the transfer device to be transferred to the oven (that is, the thermal conditioning device) to the blow-moulding machine (that is, the blow-moulding line) means in particular that there is at least one instant, at the second transfer station, where the pick-up and transport members (integral with the conveyor to move the parisons into the oven) and the transfer device (and, more specifically, suitable pick-up and transport means forming part of the transfer device) simultaneously hold the parisons (that is, the parisons located at the second transfer station).

The pick-up and transport members are mounted on the flexible feed conveyor in cantilever fashion; more specifically, they are fixed to the flexible feed conveyor at a first end and hold the parisons at a second, opposite end. Each pick-up and transport member is designed to hold and transport a single parison.

Preferably, the pick-up and transport members are fixed to the flexible feed conveyor in such a way that they are equally spaced.

In the straight stretches of the flexible feed conveyor, the pick-up and transport members are positioned parallel to each other and their second ends are located at a minimum distance from each other (substantially equal to the distance between the first ends fixed to the conveyor).

In the curved stretches of the flexible feed conveyor, on the other hand, the pick-up and transport members are positioned radially, that is to say, they diverge from each other according to the curvature radius of the curved stretch of the feed conveyor: the smaller the curvature radius, the greater the distance between the second ends of the pick-up and transport members.

That means that, according to the invention, one parison can be positioned at a desired distance from the one that comes before and/or after it along the different stretches of the path followed by the parisons on the flexible feed conveyor by simply adjusting the setup of the conveyor itself (to modify the shape of the path it defines).

Thus, according to the invention, the pick-up and transport means of the transfer device hold a predetermined number of parisons (typically one or two, the number depending on the size of the containers being made, that is to say, the number of parisons blow-moulded simultaneously in the moulding units of the blow-moulding machine, that is, the blow moulds) at the same time as respective pick-up and transport members, thereby optimizing transfer of the parisons from the oven to the blow-moulding machine without having to use gripping elements transported together with the parisons, and making it possible to change over from one size to another in a simpler and more efficient manner.

BRIEF DESCRIPTION OF THE DRAWINGS

The invention will now be described with reference to the accompanying drawings which illustrate a preferred, non-limiting embodiment of it and in which:

FIG. 3 is a schematic plan view, with some parts cut away for clarity, of a first detail from FIG. 2, shown in two different operating conditions;

FIG. 4 is a schematic plan view, with some parts cut away for clarity, of a detail from FIG. 3, shown in four different operating conditions;

FIG. 8 is a schematic plan view, with some parts cut away for clarity, of a second detail of the plant of FIG. 1;

FIG. 9 is a schematic side view, with some parts cut away for clarity, of the detail of FIG. 8; and FIG. 10 is a schematic plan view, with some parts cut away for clarity, of another embodiment of the detail of FIGS. 8 and 9;

DETAILED DESCRIPTION OF THE PREFERRED EMBODIMENTS OF THE INVENTION

Figure 1:
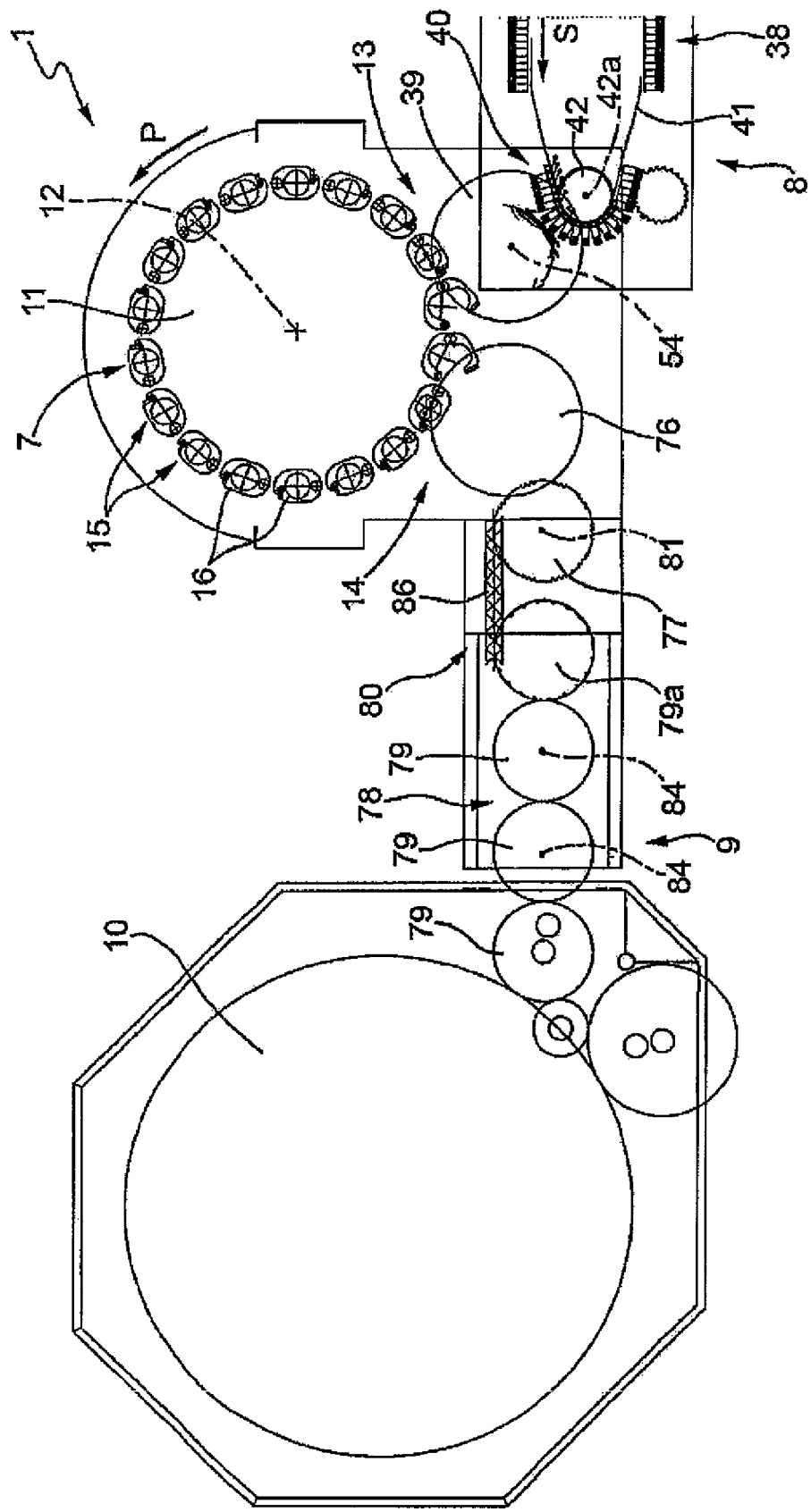
FIG. 1 is a schematic plan view, with some parts cut away for clarity, of a preferred embodiment of the plant according to the invention.

With reference to FIG. 1, the numeral 1 denotes in its entirety a plant for blow-moulding plastic containers, in this particular case, plastic bottles 2 (FIG. 9), from respective parisons 3 of known type (FIG. 5), each of which comprises an elongated cup-shaped body 4 having an externally threaded open end 5, and an annular neck 6 extending radially outwards from the outside surface of the body 4 itself.

The plant 1 comprises a blow-moulding machine 7 for blow-moulding the bottles 2, a line 8 for feeding the parisons 3 to the machine 7, and a line 9 for feeding the bottles 2 from the machine 7 to a customary filling machine 10.

Figure 2:
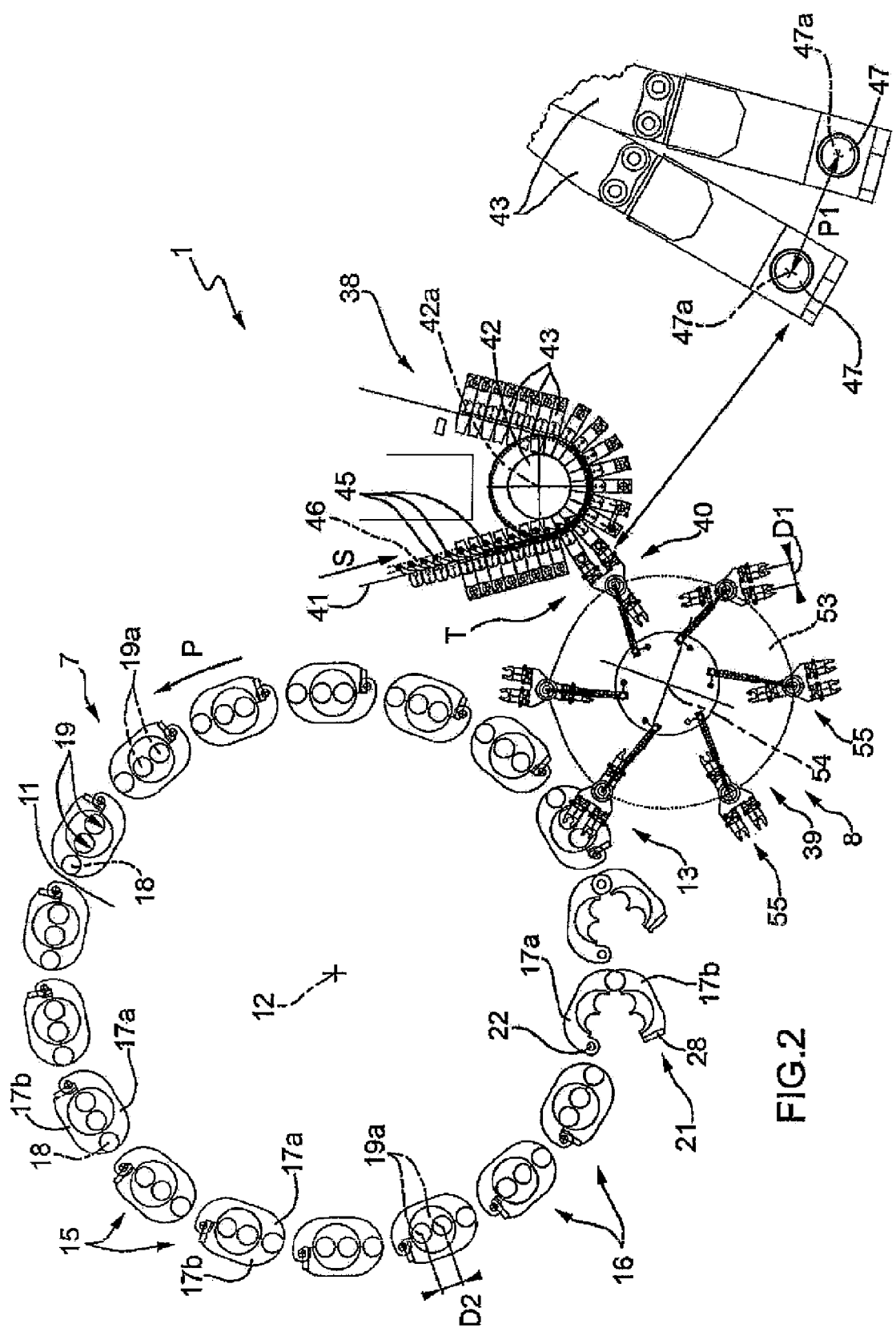
FIG. 2 is a schematic plan view, with some parts enlarged and others cut away for clarity, of a first detail of the plant of FIG. 1.

As illustrated in FIGS. 1 and 2, the machine 7 comprises a blow-moulding wheel 11 mounted in such a way as to rotate continuously (counterclockwise in FIGS. 1 and 2) about its longitudinal axis 12, which is substantially vertical and at right angles to the drawing plane of FIGS. 1 and 2. The wheel is connected to the lines 8 and 9 at a first and a second transfer station 13, 14, respectively, and is equipped with a plurality of moulding units 15 which are mounted round the edge of the wheel 11, are uniformly distributed around the axis 12 according to a predetermined spacing, and are advanced by the wheel 11 along a circular path P around the axis 12 and through the stations 13, 14.

Each unit 15 comprises an interchangeable mould 16 comprising, in the embodiment illustrated in FIGS. 2 and 3, two half-moulds 17, each hinged to the wheel 11 to rotate relative to the wheel 11, under the action of a drive device (not illustrated) about a substantially vertical pivot axis 18 parallel to the axis 12 between a position for opening (FIG. 3a) and a position for closing (FIG. 3b) two moulding cavities 19, each having the shape of a bottle 2 and a longitudinal axis 19a parallel to the axis 18, being open to the outside at a hole at the top of it smaller in diameter than the neck 6 of a parison 3, and acting in conjunction with a pneumatic device of known type, not illustrated, designed to blow compressed air into the parison 3 inside the cavity 19 to mould the respective bottle 2.

The two half-moulds 17 are oriented in such a way that they are closed in a closing plane 20 substantially tangent to the path P and are locked in position by a locking device 21 comprising a cylindrical rod 22 having a longitudinal axis 23 parallel to the axis 12, extending through one of the two half-moulds 17 (hereinafter denoted by the reference 17a) along a vertical line 24 and being rotatably coupled to the half-mould 17a to rotate, relative to the half-mould 17a, about the axis 23 itself.

The rod 22 comprises at least one undercut portion 22a limited by a flat face parallel to the axis 23, and has keyed to it a rocker arm 25 mounted coaxially with the axis 23 and in turn comprising two arms 26, 27 which extend radially outwards from the axis 23 itself.

The device 21 also comprises a latch 28, elongated in shape, which extends transversally to the line 24, is fixed to the other half-mould 17 (hereinafter denoted by the reference 17b), and has an indent 29 formed on the latch 28 along the line 24 to receive and retain the portion 22a.

During the movement of the unit 15 from the station 13 to the station 14, the two half-moulds 17a, 17b are in their closed position, and a spring 30, interposed between the arm 26 and the half-mould 17a holds the rod 22 and the latch 28 in a normally locked position (FIG. 4a), where the portion 22a engages the indent 29 to prevent the mould 16 from opening.

During the movement of the unit 15 from the station 14 to the station 13, the rod 22 is moved against the action of the spring 30 to a released position (FIG. 4b), where the portion 22a disengages the indent 29 to enable the two half-moulds 17a, 17b to move (FIGS. 4c and 4d) to the open position by engaging a tappet roller 31 mounted on the arm 27 in a cam (not illustrated) designed to control the angular position of the rocker arm 25 around the axis 23.

In connection with the above, it should be noted that the two half-moulds 17a, 17b move relative to each other through different angles between the open and closed positions of the mould 16. More specifically, the angle of movement of the half-mould 17 located radially towards the outside of the path P, namely, the half-mould 17b, is greater than the angle of movement of the half-mould 17 located radially towards the inside of the path P, namely, the half-mould 17a.

Figure 5:
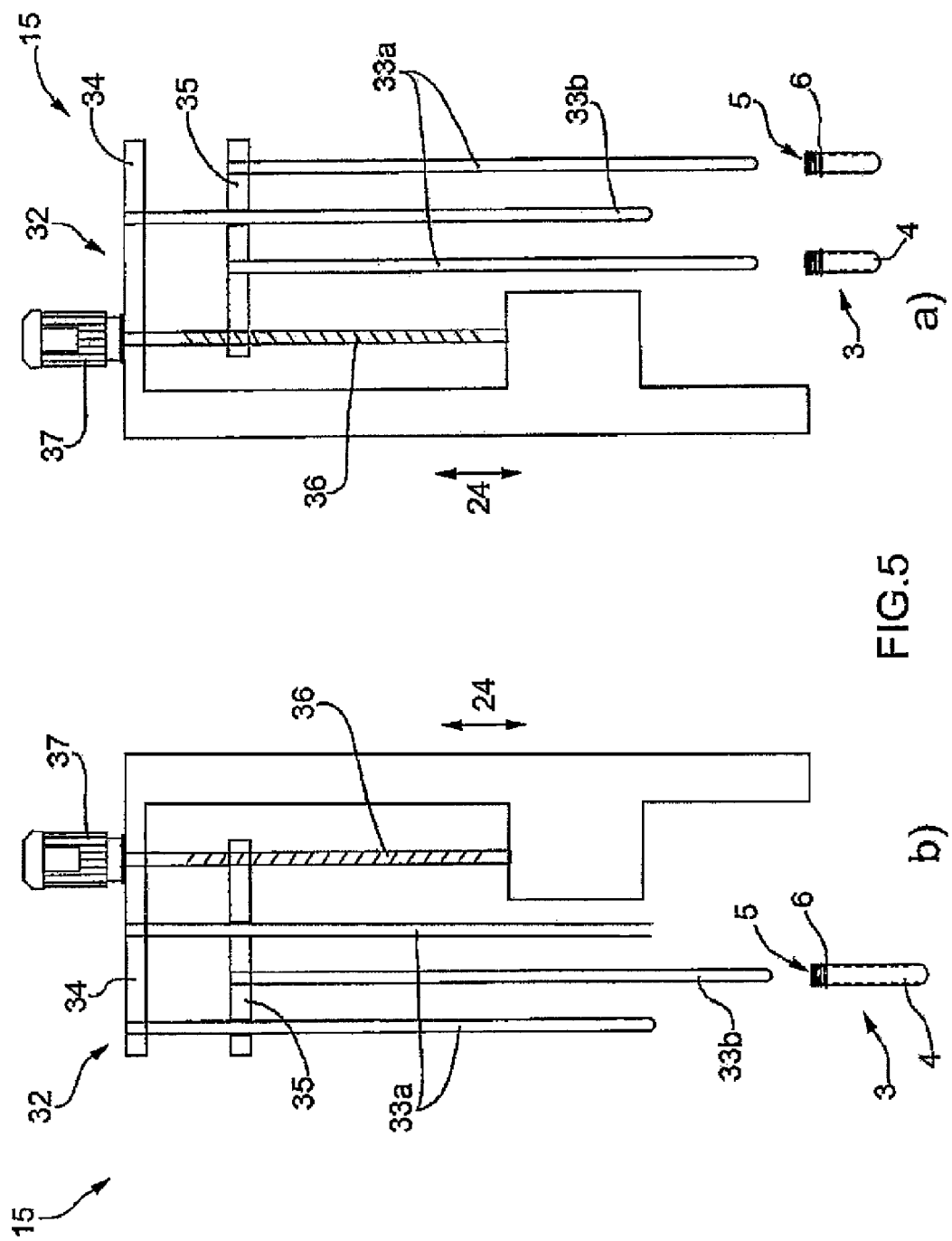
FIG. 5 is a schematic side view, with some parts cut away for clarity, of a second detail from FIG. 2, shown in two different operating conditions.

With reference to FIG. 5, the unit 15 also comprises a stretching unit 32, mounted above the mould 16 and, in this particular embodiment, comprising three stretching rods 33 parallel to each other and to the line 24, two of which (hereinafter denoted by the reference 33a) are mounted in a position coaxial with the cavities 19, and the other (hereinafter denoted by the reference 33b) extends between the rods 33a.

The rods 33a, 33b are slidably coupled to both a mounting bracket 34 fixed to the wheel 11, and to a mounting plate 35 that is in turn coupled by a lead nut and screw mechanism to an output shaft 36 of an electric motor 37 fixed to the bracket 34, and are selectively locked on the bracket 34 or on the plate 35 along the line 24 by means of customary fastening screws not illustrated.

As illustrated in FIG. 5a, when the moulds 16, that is to say, the moulds with two moulding cavities 19, are mounted on the wheel 11, the rod 33b is locked axially on the bracket 34 and the rods 33a are locked axially on the plate 35 and are driven by the motor 37 along the line 24 between respective raised positions (FIG. 5a), where the rods 33a are positioned substantially outside the respective parisons 3, and respective lowered positions (not illustrated), where the rods 33a engage the respective parisons 3 in such a way as to stretch them axially along the line 24.

As illustrated in FIG. 5b, when the moulds 16 are replaced with moulds (not illustrated) having a single central moulding cavity each, for blow-moulding a bottle 2 of larger size, the rods 33a are locked axially on the bracket 34 and the rod 33b is locked axially on the plate 35 and is driven by the motor 37 along the line 24 between a raised position (FIG. 5b), where the rod 33b is positioned substantially outside the respective parison 3, and a lowered position (not illustrated), where the rod 33b engages the respective parison 3 in such a way as to stretch it axially along the line 24.

It may be inferred from the foregoing that changing the moulds of the blow-moulding units 15 does not necessitate changing the related stretching units 32 and that setup times are therefore relatively short.

In an embodiment that is not illustrated, when the wheel 11 mounts the moulds 16, that is to say, the moulds with two moulding cavities 19, the rod 33b must be removed and, when the moulds 16 are replaced with moulds (not illustrated) having a single central moulding cavity each, the rods 33a must be removed.

With reference to FIGS. 1 and 2, the feed line 8 comprises a heating device 38 for thermally conditioning the plastic material the parisons 3 are made of to a temperature greater than their glass transition temperature, and a transfer wheel 39 connected to the device 38 at a transfer station 40 and to the blow-moulding wheel 11 at the station 13.

The device 38 comprises an endless chain conveyor 41 that is trained around two pulleys 42 (only one of which is illustrated in FIGS. 1 and 2) rotatably mounted to turn about respective longitudinal axes 42a parallel to the line 24, extends through at least one customary oven not illustrated, and mounts a plurality of pick-up and transport means 43 (that is to say, pick-up and transporting members 43) uniformly distributed along the conveyor 41 and advanced by the conveyor 41 itself along an annular path S.

Figure 6:
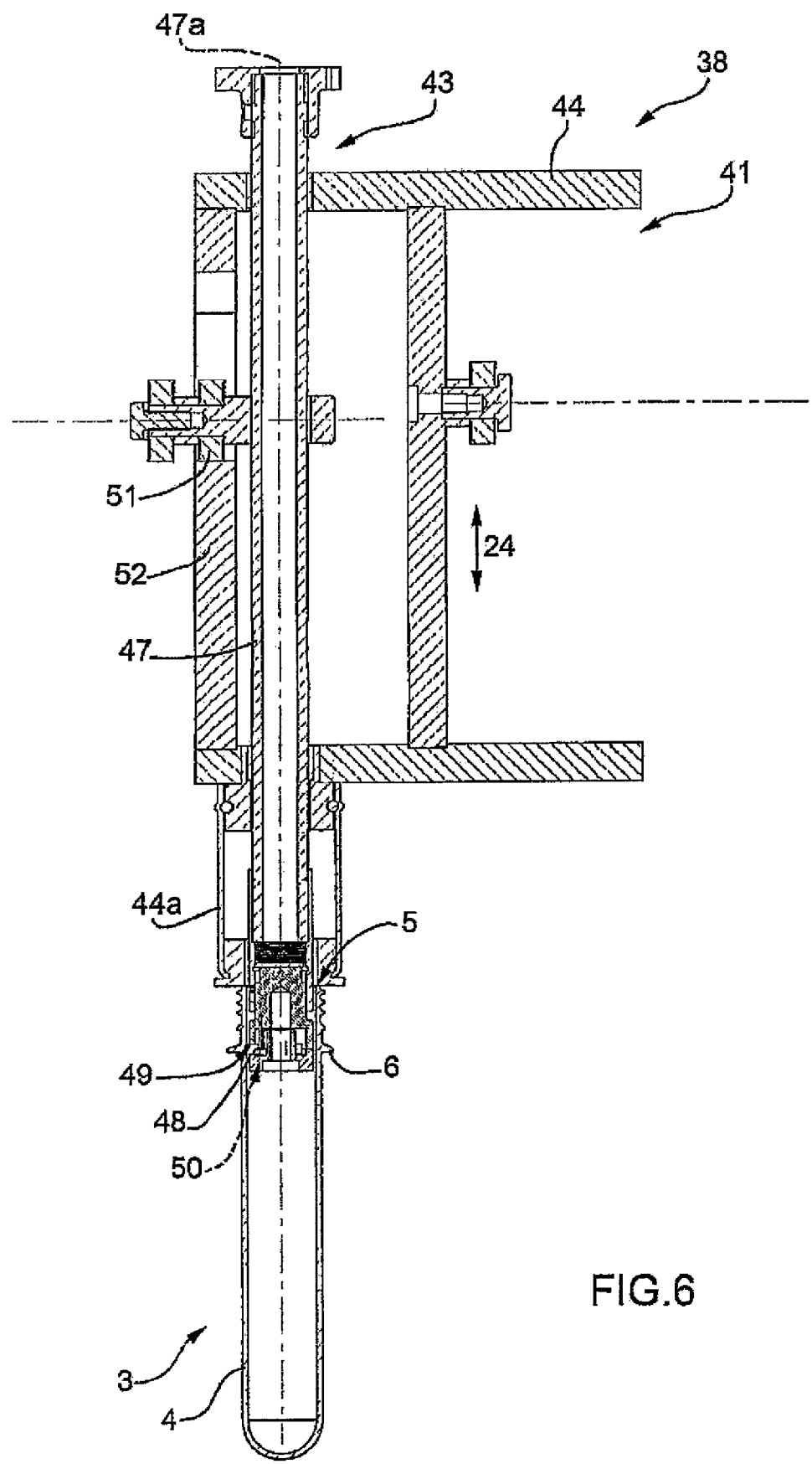
FIG. 6 is a schematic side view, with some parts cut away for clarity, of a third detail from FIG. 2.

As illustrated in FIGS. 2 and 6, each member 43 comprises a tubular guide element 44 that is hooked up to the conveyor 41, extends along the line 24, is held in the correct position by engagement with a tappet roller 45 at a cam 46, and is slidably engaged by a respective pick-up rod 47 whose longitudinal axis 47a is parallel to the line 24.

The rod 47 is equipped with a plurality of balls 48 that are uniformly distributed around the axis 47a, are seated in respective housings 49 formed radially on a bottom end of the rod 47 protruding to the outside of the element 44, and protrude radially outwards from the respective housings 49 under the pushing action of respective springs 50 mounted inside the respective housings 49 transversally to the line 24.

The rod 47 is mobile under the pushing action of a tappet roller 51 placed in contact with a cam 52, along the line 24 between a lowered position (not illustrated), where the rod 47 extends inside the respective parison 3 to allow the balls 48 to grip the parison 3 under the pushing action of the respective springs 50, and a raised position (FIG. 6), where the rod 47 disengages the parison 3.

The member 43 further comprises an interchangeable limit stop block 44a that protrudes downwardly from the element 44 coaxially with the axis 47a to come into contact with the end 5 of the parison 3, is removably mounted on the element 44, and can be replaced according to the size and/or shape of the end 5 itself.

Figure 7:
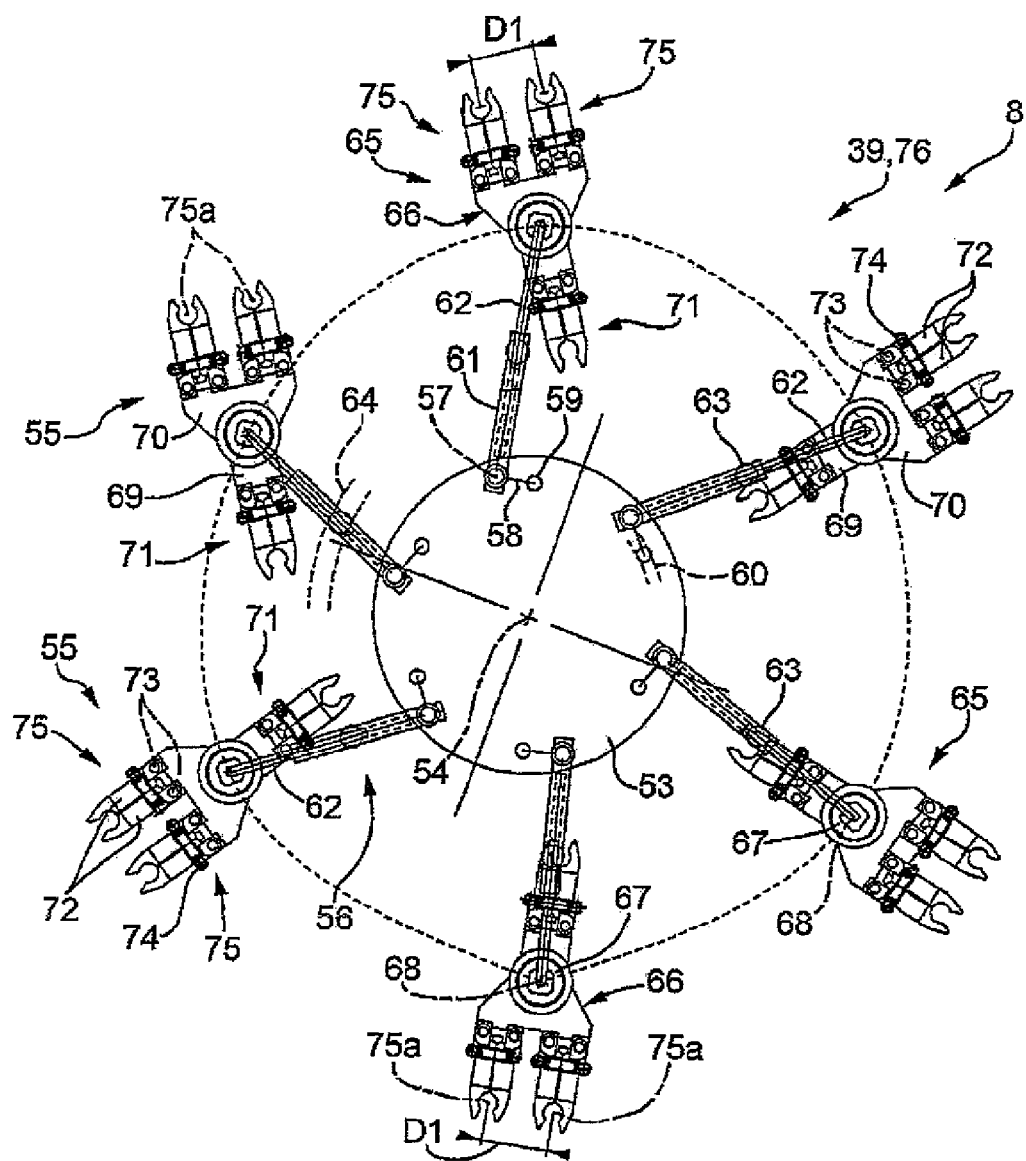
FIG. 7 is a schematic plan view, with some parts cut away for clarity, of a fourth detail from FIG. 2.
Figure 11:
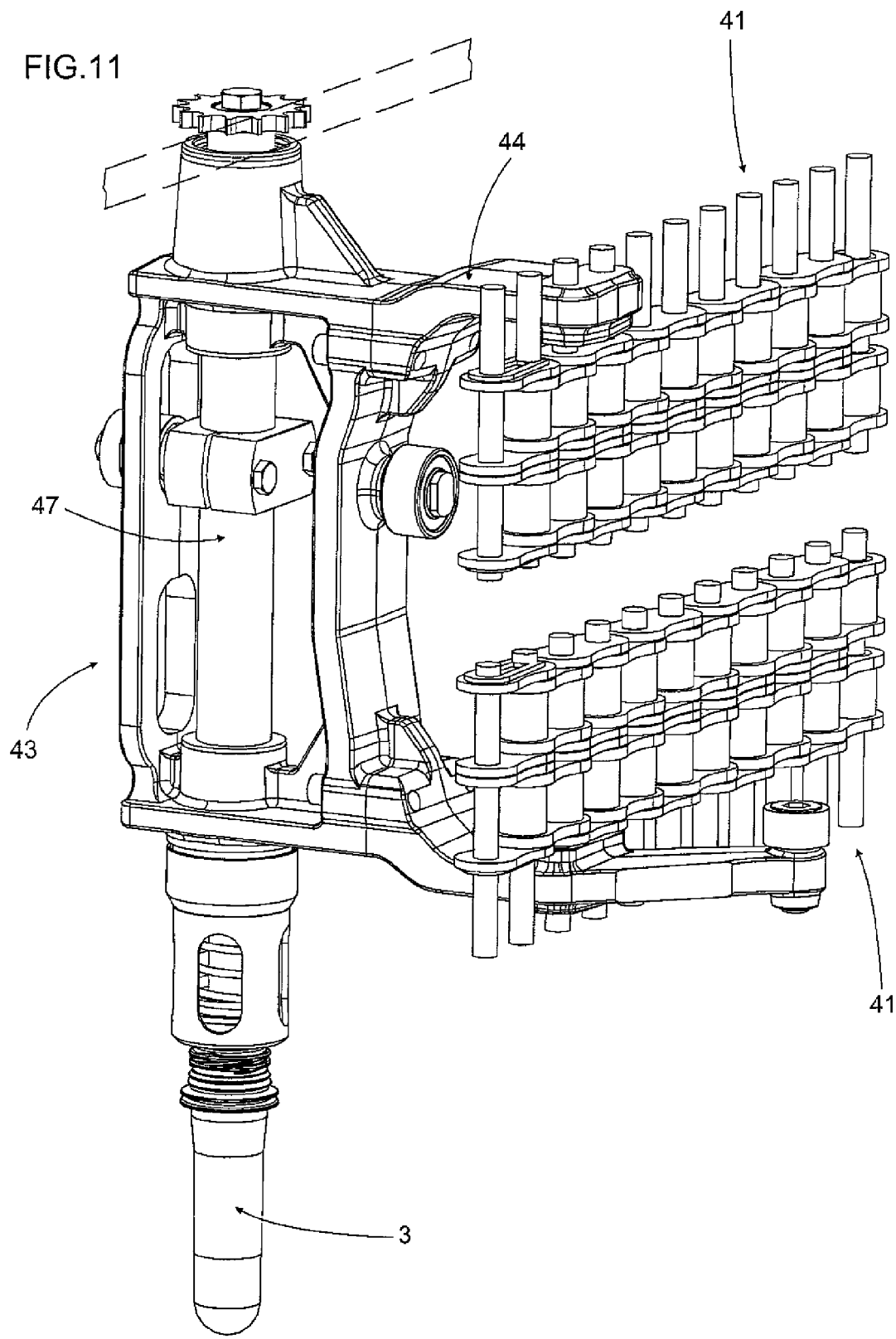
FIG. 11 is a perspective view of the detail illustrated in FIG. 6.

With reference to FIGS. 2 and 7, the wheel 39 comprises a drum 53 mounted to turn continuously about its substantially vertical longitudinal axis 54 parallel to the line 24, and a plurality of pick-up and transporting units 55 (in this particular embodiment six pick-up and transporting units 55) that are mounted along a peripheral edge of the drum 53, protrude radially outwards from the drum 53, and are advanced by the drum 53 itself around the axis 54 and through the stations 13 and 40.

Each unit 55 comprises a supporting rocker arm 56 that is hinged to the drum 53 to turn relative to the drum 53 itself about a pivot axis 57 substantially parallel to the line 24, and is equipped, at its first arm 58, with a tappet roller 59 in contact with a cam 60 designed to control the angular position of the rocker arm 56 around the axis 57 itself.

The rocker arm 56 also comprises a second, elongated arm 61 slidably engaged by a slider 62 that is equipped with a tappet roller 63 in contact with a cam 64 designed to control the position of the slider 62 along the arm 61, and supports at a free end of it, protruding to the outside of the arm 61 itself, a pick-up unit 65 comprising a rocker arm 66 hinged to the slider 62 to turn relative to the slider 62 and under the action, in this embodiment, of an electric motor 67 mounted on the slider 62, about a pivot axis 68 parallel to the line 24.

The rocker arm 66 has two arms 69, 70, opposite each other. The arm 69 mounts a pick-up element 71 having the shape of a fork and comprising two arms 72 which are mounted to oscillate about respective pivot axes 73 parallel to the line 24 between a position of releasing (not illustrated) and a position of clamping (FIG. 7) a respective parison 3, and which a spring 74 interposed between the arms 72 normally holds in the clamping position where the arms 72 grip the parison 3 above the neck 6.

The arm 70 mounts two pick-up elements 75 entirely equivalent to the element 71, parallel to each other and positioned side by side, having concavities facing away from the concavity of the element 71, and further having respective longitudinal axes 75a that are parallel to the line 24 and spaced from each other at a distance D1 equal to the distance D2 between the longitudinal axes 19a of the two moulding cavities 19 of one mould 16.

In connection with the above, it should be noted that:
according to the number of moulding cavities 19 in each mould 16, the pick-up elements 71, 75 are selectively oriented by the respective electric motors 67 about the respective axes 68 between respective operating positions where the pick-up elements 71, 75 are oriented towards the outside of the wheel 39, and respective rest positions where the pick-up elements 71, 75 are oriented towards the inside of the wheel 39;
by combining the movements of the rocker arms 56 about the respective axes 57 with the movements of the sliders 62 along the respective arms 61 and with the movements of the rocker arms 66 about the respective axes 68, the elements 71, 75 in their operating positions are kept substantially parallel to the path P at the station 13 and parallel to the path S at the station 40; and the station 40 for transferring the parisons 3 from the conveyor 41 to the wheel 39 is positioned along a curved stretch T of the path S, preferably a stretch T around one of the pulleys 42, where the spacing P1 between the rods 47, and hence between the parisons 3, is equal to the distance D1 and hence to the distance D2, and different from the spacing between the rods 47 and, hence between the parisons 3, along the straight stretches of the path S.

From the above it may be inferred that the position of the station 40 and the shape of the wheel 39 make it possible to set up the plant 1 quickly and easily not only using moulds 16 with two moulding cavities 19 but also using moulds (not illustrated) with a single moulding cavity.

In another embodiment that is not illustrated, the rocker arms 66 are eliminated and replaced with interchangeable pick-up units, each of which is hinged to the respective slider 62 to oscillate about the respective axis 68 under the control of a tappet roller engaged in a cam, and which is equipped with one pick-up element 71 or two pick-up elements 75.

As illustrated in FIG. 1, the feed line 9 comprises: a transfer wheel 76 that is connected with the wheel 11 at the station 14, is entirely equivalent to the wheel 39 and will not therefore be described in further detail; a wheel 77 for extracting the bottles 2 from the pick-up elements 71, 75 of the transfer wheel 76; and a train 78 of feed wheels 79 connected to the wheel 77 through an interposed dispensing device 80 and designed to feed the bottles 2 to the filling machine 10.

With reference to FIG. 8, the wheel 77 is mounted to rotate continuously about its longitudinal axis 81 parallel to the line 24, and is equipped with a plurality of semi-cylindrical pockets 82 formed along a peripheral edge of the wheel 77, open radially towards the outside, each designed to receive and retain a bottle 2, and divided into a plurality of groups 83 of pockets 82 equally spaced around the axis 81 and each comprising, in this particular embodiment, three pockets 82, of which one (hereinafter denoted by the reference 82a) is positioned between the other two (hereinafter denoted by the reference 82b) in turn positioned from each other at a distance D3 equal to the distances D1 and D2.

Each wheel 79 is mounted to rotate continuously about its longitudinal axis 84 parallel to the line 24, and is equipped with a plurality of semi-cylindrical pockets 85 formed along a peripheral edge of the wheel 79, open radially towards the outside, each designed to receive and retain a bottle 2, and uniformly distributed around the axis 84 according to a spacing P2 equal to the spacing of the dispensing nozzles (not illustrated) of the filling machine 10.

In this connection it should be noted that the spacing P2 is greater than the distance D3 and less than a distance D4 between two adjacent pockets 82a and that the distance D4 is also equal to the spacing between the moulds 16 on the blow-moulding wheel 11 and is therefore different from the distance D2.

As illustrated in FIGS. 8 and 9, the dispensing device 80 comprises, in this embodiment, a screw feeder 86, that is mounted to rotate continuously about its longitudinal, substantially horizontal axis 87 transversal to the line 24, extends between the wheel 77 and the infeed wheel 79 (hereinafter denoted by the reference 79a) of the train 78 of wheels 79, has two starts 88, that is to say, a number of starts equal to the number of moulding cavities 19 of one mould 16, is designed to engage the bottles 2 above the respective necks 6, and acts in conjunction with a guide channel 89 which extends parallel with the axis 87, which is slidably engaged by the bottles 2 and which is delimited by two side walls 90 designed to support the bottles 2 under the respective necks 6.

The embodiment illustrated in FIG. 10 differs from the one illustrated in the drawings described up to now only in that:

the moulds 16 with two moulding cavities 19 are eliminated and replaced with moulds (not illustrated) having only one moulding cavity;

the pick-up elements 71, 75 operate and come to rest at positions different from the above; and the screw feeder 86 is eliminated and replaced with a screw feeder 91 having a single start 92.

In an embodiment that is not illustrated, the dispensing device 80 is eliminated and replaced with a customary, variable spacing transfer wheel.

The operation of the plant 1 will now be described with reference to the moulds 16 with two moulding cavities 19 and starting from an instant where the pick-up elements 71, 75 of the transfer wheels 39, 76 have been moved to their rest and operating positions, respectively.

The conveyor 41 feeds the parisons 3 one after the other to the station 40 where the spacing P1 of the parisons 3 is equal to the distance D1 between the pick-up elements 75 of each pick-up unit 65 of the wheel 39 so that each unit 65 can pick up a pair of parisons 3 from the conveyor 41.

Each pick-up unit 65 is then advanced by the wheel 39 through the transfer station 13 in step with a respective mould 16, whose half-moulds 17a, 17b are opened at the station 14 after the respective rod 22 has been moved to the released position in order to drop the parisons 3 into the respective moulding cavities 19.

At this point, the two half-moulds 17a, 17b are closed; the rod 22 is moved by the spring 30 to the latch 28 locked position; and the bottles 2 are moulded as the mould 16 advances from the station 13 to the station 14, where the mould 16 is opened to enable the pick-up elements 75 of one pick-up unit 65 of the transfer wheel 76 to extract the bottles 2 just moulded.

After that, the bottles 2 are first transferred by the wheel 76 into the pockets 82b of one group 83 of pockets 82 on the extraction wheel 77, are then advanced by the wheel 77 to the infeed end of the channel 89 and by the screw feeder 86 along the channel 89 and, lastly, are transferred by the screw feeder 86 into the pockets 85 of the wheel 79a according to the aforementioned spacing P2.

Operation of the plant 1 with moulds (not illustrated) having a single moulding cavity involves simply replacing the moulds 16 with the other moulds, moving the pick-up elements 71, 75 of the transfer wheels 39, 76 to their operating and rest positions, respectively, and replacing the screw feeder 86 with the screw feeder 91. It should be noted that, in this case, each bottle 2 is first transferred by the wheel 76 into the pocket 82a of one group 83 of pockets 82 on the extraction wheel 77, is then advanced by the wheel 77 to the infeed end of the channel 89 and by the screw feeder 91 along the channel 89 and, lastly is transferred by the screw feeder 91 into a pocket 85 of the wheel 79a according to the aforementioned spacing P2.

From the above it may be inferred that the position of the station 40, the shape of the transfer wheels 39, 76 and the presence of the screw feeders 86, 91 make it possible to set up the plant 1 quickly and easily not only using moulds 16 with two moulding cavities 19 but also using moulds (not illustrated) with a single moulding cavity, and to feed the same filling machine 10 and according to the same spacing P2 with bottles 2 of different sizes made in moulds 16 with two moulding cavities 19 as well as in moulds (not illustrated) with a single moulding cavity.

Lastly, it should be noted that, preferably, the assembly composed of the blow-moulding wheel 11, the transfer wheels 39, 76, the extraction wheel 77 and the screw feeders 86, 91 is driven by one drive motor (not illustrated), while the chain conveyor 41 and the train 78 of feed wheels 79 may be driven either by a single drive motor (not illustrated) or, alternatively, by separate motors (not illustrated) synchronized with each other. Indeed, since the use of moulds 16 with two moulding cavities 19 confers on the blow-moulding machine 7 a production capacity that is twice the production capacity conferred on the blow-moulding machine 7 by the use of moulds (not illustrated) with a single moulding cavity, the feed speeds of the conveyor 41 and of the train 78 of feed wheels 79 are selectively controlled in such a way that when the machine 7 mounts moulds 16 with two moulding cavities 19 the speeds are substantially twice the speeds imparted to the conveyor 41 and to the train 78 of feed wheels 79 when the machine 7 mounts moulds (not illustrated) with a single moulding cavity.

The invention claimed is:

1. A blow-moulding plant for making plastic containers (2) from respective parisons (3), comprising:
   a blow-moulding line (7) equipped with a plurality of moulding units (15), each comprising at least two cavities (19) for blow-moulding respective containers (2), the moulding cavities (19) of each moulding unit (15) having respective first longitudinal axes (19*a*) positioned at a first predetermined distance (D2) from each other;
   a flexible feed conveyor (41) which is equipped with a plurality of members (43) for picking up and transporting respective parisons (3) and which extends through a thermal conditioning device (38);
   a parison (3) transfer device (39) coupled to the blow-moulding line (7) at a first transfer station (13) for transferring the parisons (3) to the moulding units (15) and coupled to the flexible feed conveyor (41) at a second transfer station (40) for receiving the parisons (3);
   a plurality of pick-up and transfer members (43) associated with the flexible feed conveyor (41) for moving the parisons (3) individually along a predetermined path,
   wherein the flexible feed conveyor (41) extending through the thermal conditioning device (38), at the second transfer station (40), is shaped in such a way that couples of consecutive parisons (3) engaged with the respective pick-up and transfer members (43) of the flexible feed conveyor (41) are spaced on the flexible feed conveyor (41) according to a spacing (P1) that is equal to the first distance (D2) so that they can be picked up directly from the transfer device (39) and put in the cavities (19) of the corresponding moulding unit (15),
   wherein the flexible feed conveyor (41) comprises a chain arranged in closed loop and having a succession of rotating joints, each joint defines a vertical rotation axis, each pick-up and transfer members (43) has (i) a structure connected at two consecutive rotating joints of the chain whereby it is hooked up to the conveyor (41) to project outwardly from the chain loop in cantilever fashion, and (ii) a mandrel (47) pivotally coupled to the structure to rotate about a vertical axis,
   wherein the mandrel of each pick-up and transfer members (43) has a pinion at its top end, which is configured to engage with a stationary element to put the mandrel in rotation as a consequence of the movement of the corresponding pick-up and transfer member (43) along said predetermined path.

2. The plant according to claim 1, wherein the flexible feed conveyor (41) has at least one curved stretch (T) at the second transfer station (40).

3. The plant according to claim 2, wherein the flexible feed conveyor (41) comprises at least one straight stretch; the pick-up and transport members (43) and the parisons (3) associated with them being spaced along said straight stretch according to another spacing that is different from the spacing (P1).

4. The plant according to claim 1, wherein the transfer device (39) comprises a single transfer wheel (39) connected to the blow-moulding line (7) and to the flexible feed conveyor (41) at the first and second transfer stations (13, 40), respectively.

5. The plant according to claim 1, wherein the transfer device (39) comprises at least one pick-up and transporting unit (65) mobile through the first and second transfer stations (13, 40) to feed into a moulding unit (15) a number of parisons (3) equal to the number of moulding cavities (19).

6. The plant according to claim 5, wherein the pick-up and transporting unit (65) comprises a plurality of pick-up and transporting elements (75) equal in number to the number of moulding cavities (19) of one moulding unit (15).

7. The plant according to claim 6, wherein the pick-up and transporting elements (75) of each pick-up and transporting unit (65) have respective second longitudinal vertical axes (75*a*) positioned at a predetermined second distance (D1) from each other; the second distance (D1) being fixed and equal to the first distance (D2).

8. The plant according to claim 1, wherein the flexible feed conveyor (41) and the blow-moulding line (7) are movable along a first and a second annular path (S, P), respectively, an orienting device (56, 62, 66) being provided for keeping the pick-up and transporting units (65) of the blow-moulding line (7) substantially parallel with the first path (S) at the second transfer station (40) and with the second path (P) at the first transfer station (13) so that the parisons (3) at the second transfer station (40) are held simultaneously both by the pick-up and transporting units (65) and by the pick-up and transport members (43).

9. The plant according to claim 1, wherein each moulding unit (15) moves along a second annular path (P), comprises two half-moulds (17*a*, 17*b*) mobile relative to each other between a position for opening and a position for closing the respective moulding cavities (19) and has a plane (20) where the two half-moulds (17*a*, 17*b*) close and which is substantially parallel to the path (P).

10. The plant according to claim 1, wherein the flexible feed conveyor (41) is a chain conveyor.

11. A blow-moulding plant for making plastic containers (2) from respective parisons (3), comprising:
    a blow-moulding line (7) equipped with a plurality of moulding units (15), each comprising at least two cavities (19) for blow-moulding respective containers (2), the moulding cavities (19) of each moulding unit (15) having respective first longitudinal axes (19*a*) positioned at a first predetermined distance (D2) from each other;
    a flexible feed conveyor (41) which is equipped with a plurality of members (43) for picking up and transporting respective parisons (3) and which extends through a thermal conditioning device (38);
    a parison (3) transfer device (39) coupled to the blow-moulding line (7) at a first transfer station (13) for transferring the parisons (3) to the molding units (15) and coupled to the flexible feed conveyor (41) at a second transfer station (40) for receiving the parisons (3);
    a plurality of pick-up and transfer members (43) associated with the flexible feed conveyor (41) for moving the parisons (3) individually along a predetermined path, wherein the flexible feed conveyor (41) extending through the thermal conditioning device (38), at the second transfer station (40), is shaped in such a way that couples of consecutive parisons (3) engaged with the respective pick-up and transfer members (43) of the flexible feed conveyor (41) are spaced on the flexible feed conveyor (41) according to a spacing (P1) that is equal to the first distance (D2) so that they can be picked up directly from the transfer device (39) and put in the cavities (19) of the corresponding molding unit (15), wherein the flexible feed conveyor (41) comprises a chain arranged in closed loop and having a succession of rotating joints, each joint defines a vertical rotation axis, each pick-up and transfer members (43) has (i) a holding structure connected at two consecutive rotating joints of the chain whereby it is hooked up to the conveyor (41) to project outwardly from the chain loop in cantilever fashion, and (ii) a mandrel (47) pivotally coupled to the structure to rotate about a vertical axis, wherein the chain comprises at least a central portion defined by a plurality of chain links mashed with the rotating joints, an upper portion defined by a first plurality of pins extending from respective rotating joints and projecting upward from said central portion, and a lower portion defined by a second plurality of pins extending from respective rotating joints and projecting downward from said central portion, wherein the holding structure of each pick-up and transfer members (43) has an upper arm connected to two consecutive pins of said first plurality of pins and a lower arm connected to corresponding two consecutive pins of said second plurality of pins.

12. The blow-moulding plant of claim 11, wherein, in the holding structure of each pick-up and transfer members (43), the upper arm and the lower arm are detachable from a remaining body of the holding structure itself through locking elements provided between the upper arm and the body of the holding structure and between the lower arm and the body of the holding structure.

* * * * *